United States Patent
Huang et al.

(10) Patent No.: US 10,108,571 B2
(45) Date of Patent: Oct. 23, 2018

(54) BUS CONTROLLER AND DATA TRANSMISSION METHOD THEREOF

(71) Applicant: ASMedia Technology Inc., New Taipei (TW)

(72) Inventors: Hsin-Chih Huang, New Taipei (TW); Wei-Yun Chang, New Taipei (TW)

(73) Assignee: ASMEDIA TECHNOLOGY INC., New Taipei (TW)

( * ) Notice: Subject to any disclaimer, the term of this patent is extended or adjusted under 35 U.S.C. 154(b) by 269 days.

(21) Appl. No.: 14/936,696

(22) Filed: Nov. 10, 2015

(65) Prior Publication Data

US 2016/0147683 A1 May 26, 2016

(30) Foreign Application Priority Data

Nov. 20, 2014 (TW) .............................. 103140284 A

(51) Int. Cl.
*G06F 13/366* (2006.01)
*G06F 13/40* (2006.01)

(52) U.S. Cl.
CPC ........ *G06F 13/366* (2013.01); *G06F 13/4068* (2013.01)

(58) Field of Classification Search
CPC .............. G06F 13/385; G06F 13/4022; G06F 13/4027; G06F 2213/0042; G06F 2213/4022
See application file for complete search history.

(56) References Cited

U.S. PATENT DOCUMENTS

| 8,510,494 | B2* | 8/2013 | Pietri | G06F 13/4022 |
| | | | | 710/29 |
| 8,521,934 | B1* | 8/2013 | Ni | G06F 13/28 |
| | | | | 710/105 |
| 9,043,528 | B2* | 5/2015 | Hsu | G06F 13/4221 |
| | | | | 710/314 |
| 9,063,828 | B2* | 6/2015 | Numamoto | G06F 13/00 |
| 2012/0233373 | A1* | 9/2012 | Ohashi | G06F 13/38 |
| | | | | 710/313 |
| 2012/0290757 | A1* | 11/2012 | Cheng | G06F 1/26 |
| | | | | 710/301 |
| 2013/0013842 | A1 | 1/2013 | Numamoto | |
| 2014/0019654 | A1 | 1/2014 | Trivedi | |

FOREIGN PATENT DOCUMENTS

| CN | 101727419 B | 8/2012 |
| CN | 103533306 A | 1/2014 |
| TW | 201202943 A | 1/2012 |

* cited by examiner

*Primary Examiner* — Brian T Misiura
(74) *Attorney, Agent, or Firm* — CKC & Partners Co., Ltd.

(57) ABSTRACT

A data transmission method includes: determining a sum of first service proportions and a sum of second service proportions according to a first transmission rate of at least one first device, a second transmission rate of at least one second device, and a maximum bandwidth of a host transmission interface; determining at least one first service proportion of the first device according to the sum of the first service proportions, and determining at least one second service proportion of the second device according to the sum of the second service proportions; and transmitting at least one package of first transmission data of the first device and at least one package of second transmission data of the second device to a host via the host transmission interface according to the first service proportion and the second service proportion.

10 Claims, 7 Drawing Sheets

BUS CONTROLLER AND DATA TRANSMISSION METHOD THEREOF

CROSS-REFERENCE TO RELATED APPLICATION

This application claims the priority benefit of Taiwan application serial No. 103140284, filed on Nov. 20, 2014. The entirety of the above-mentioned patent application is hereby incorporated by reference herein and made a part of specification.

BACKGROUND OF THE INVENTION

Field of the Invention

The disclosure relates to a bus controller and a data transmission method.

Description of the Related Art

A universal serial bus (USB) is widely used in various electronic devices, such as a personal computer (PC) or a mobile device.

Generally, a host USB controller is electrically connected to a USB device (such as a USB drive) and a host (such as a PC), respectively, and data are transmitted between the USB device and the host. The host USB controller is connected to different USB devices to transmit data therebetween.

BRIEF SUMMARY OF THE INVENTION

In an embodiment, a bus controller includes a group of first device transmission interfaces electrically connected to at least one first device; a group of the second device transmission interfaces electrically connected to at least one second device; a host transmission interface electrically connected to a host; and a control module electrically connected to the first device transmission interfaces, the second device transmission interfaces and the host transmission interface, respectively. The control module transmits data to the host according to at least one first service proportion of the first device and at least one second service proportion of the second device.

In an embodiment, a data transmission method includes following steps: determining a sum of first service proportions and a sum of second service proportions according to a first transmission rate of at least one first device, a second transmission rate of at least one second device and a maximum bandwidth of a host transmission interface; determining at least one first service proportion of the first device according to the sum of the first service proportions, and determining at least one second service proportion of the second device according to the sum of the second service proportions; and transmitting at least one package of first transmission data of the first device and at least one package of second transmission data of the second device to a host via the host transmission interface according to the first service proportion and the second service proportion.

DETAILED DESCRIPTION OF THE EMBODIMENTS

The terms "first", "second" and so on do not mean a sequence and do not limit the embodiment. They are used for distinguishing the components or operations described by same terms.

The phrase "electrically connect" means two or more elements physically or electrically contact with each other directly or indirectly, and the phrase "electrically connect" further means two or more elements cooperate or activate with each other, which is not limited herein.

In an embodiment, a host universal serial bus (USB) controller of a data transmission system is a bus controller, which is not limited herein. The bus controllers of other types (such as a serial advanced technology attachment (SATA) bus controller) are within the scope.

Figure 1:
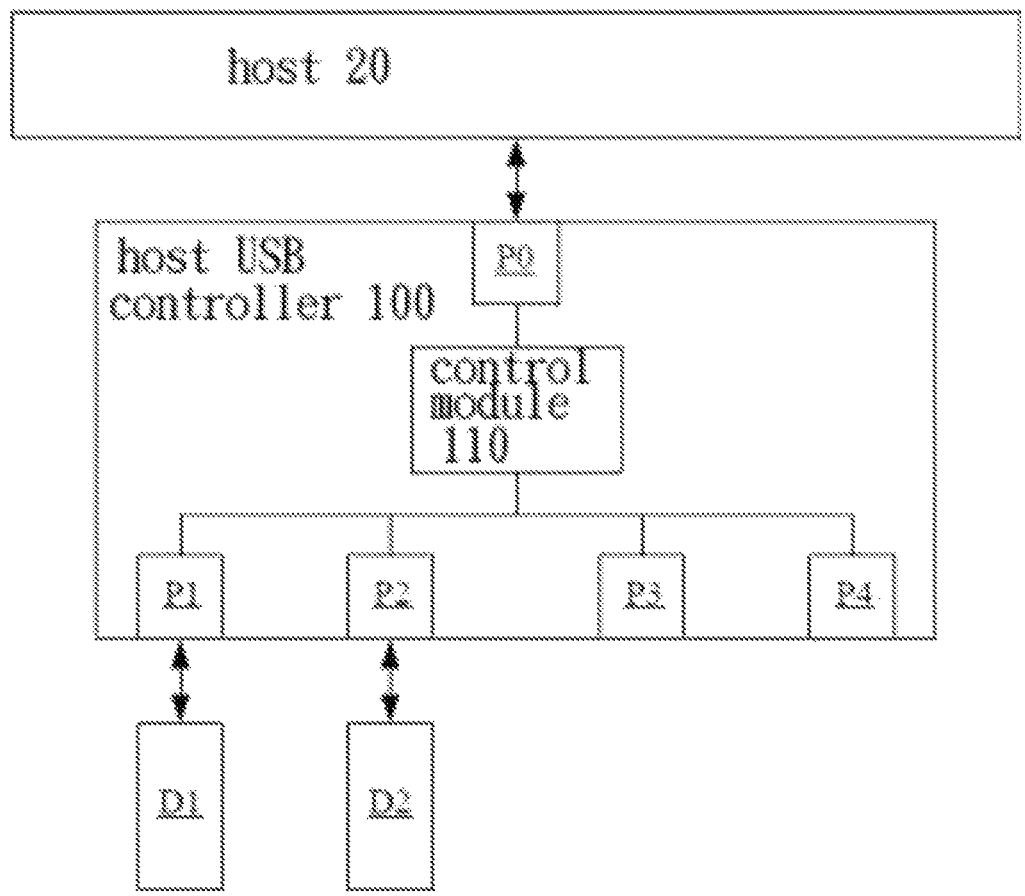
FIG. 1 is a schematic diagram showing a data transmission system in an embodiment.

FIG. 1 is a schematic diagram showing a data transmission system 10 in an embodiment. The data transmission system 10 includes a host 20, a host USB controller 100, and devices D1 and D2 (such as USB devices). The host USB controller 100 is electrically connected to the host 20 and the USB devices D1 and D2, respectively. The number of the USB devices D1 and D2 is not limited. In an embodiment, the host 20 is a PC, and the USB devices D1 and D2 are USB drives, which is not limited.

In the embodiment, the host USB controller 100 includes a control module 110, a host transmission interface P0, and device transmission interfaces P1 to P4. The control module 110 is electrically connected to the host transmission interface P0 and the device transmission interfaces P1 to P4, respectively. The host transmission interface P0 electrically connected to the host 20. The device transmission interfaces P1 and P2 are electrically connected to the USB devices D1 and D2, respectively. The number of the device transmission interfaces P1 to P4 and the connection between the device transmission interfaces P1 to P4 and the USB devices D1 and D2 are not limited herein.

In an embodiment, the host transmission interface P0 is electrically connected to the host 20 via a peripheral component interface express (PCIe) bus, and the device transmission interfaces P1 and P2 are electrically connected to the USB devices D1 and D2 via USBs. In an embodiment, the control module 110 may be a micro-processor, a programmable logic device (PLD) or a field-programmable gate array (FPGA).

In the embodiment, the USB devices D1 and D2 have different transmission rates, such as a first transmission rate and a second transmission rate. In an embodiment, the USB device D1 supports the USB 3.1 interface, the first transmission rate of the USB device D1 is 10 GB/s, and the; USB device D2 supports the USB 3.0 interface, the second transmission rate of the USB device D2 is 5 GB/s.

In the embodiment, the control module 110 receives the first transmission data and the second transmission data from the USB devices D1 and D2 via the device transmission interfaces P1 and P2, converts the first transmission data and the second transmission data to appropriate formats, and transmits the converted first transmission data and the second transmission data to the host 20 via the host transmission interface P0.

In the embodiment, the control module 110 determines the first service proportion of the USB device D1 and the second service proportion of the USB device D2 according to the transmission capability of the USB devices D1 and D2 and the host transmission interface P0, and the control module 110 receives and transmits the first transmission data and the second transmission data to the host 20 according to the first service proportion and the second service proportion.

"The first service proportion and the second service proportion" means a ratio of the frequencies of the control module 110 receiving and transmitting the first transmission data and the second transmission data. In an embodiment, the first service proportion is 80%, the second service proportion is 20%, and the frequency of the control module 110 receiving and transmitting the first transmission data is four times (80%/20%=4) that of the control module 110 receiving and transmitting the second transmission data.

Figure 2:
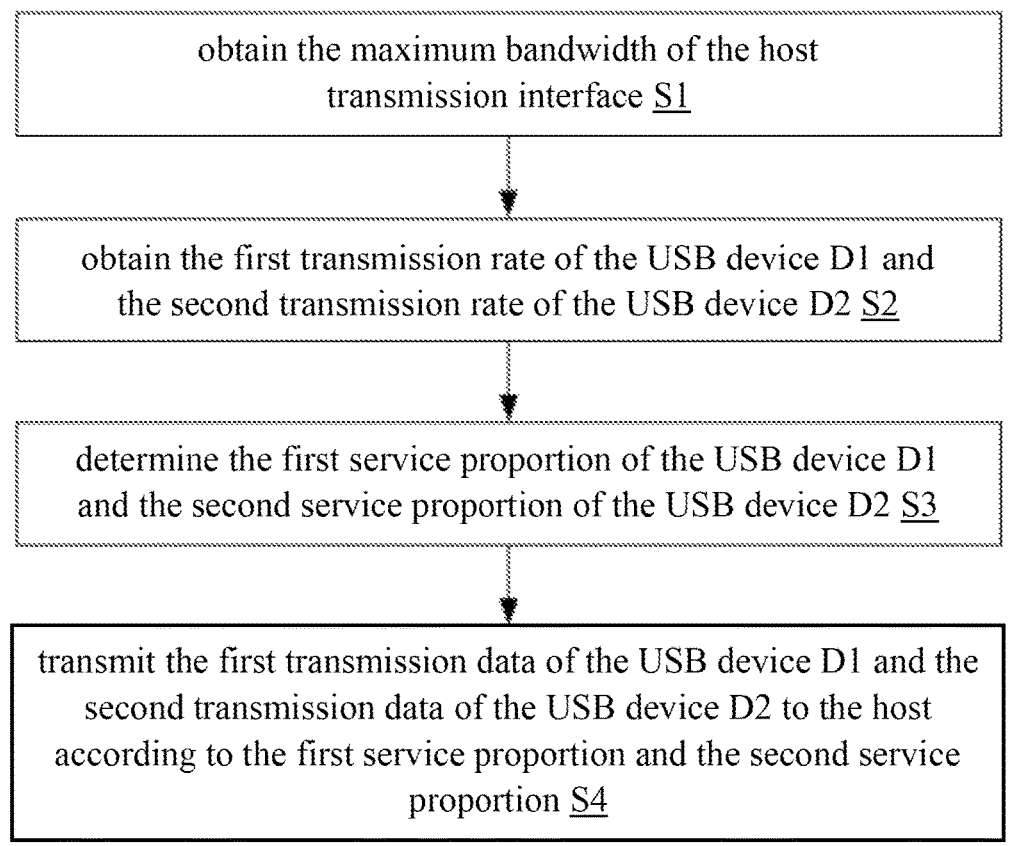
FIG. 2 is a flow chart showing a data transmission method in an embodiment.

Details of the operation of the host USB controller 100 are provided with FIG. 2.

FIG. 2 is a flow chart showing a data transmission method 200 in an embodiment. The data transmission method 200 is applied to the host USB controller 100 in FIG. 1. The embodiment is illustrated with FIG. 1 and FIG. 2. The steps of the data transmission method 200 do not have a sequence unless expressly stated. The steps can be executed at the same time, or there are overlaps on the operation time.

In the embodiment, the data transmission method 200 includes following steps

In the step S1, the control module 110 obtains the maximum bandwidth of the host transmission interface P0.

In the step S2, the control module 110 obtains the first transmission rate of the USB device D1 and the second transmission rate of the USB device D2, respectively.

In the step S3, the control module 110 determines the first service proportion of the USB device D1 and the second service proportion of the USB device D2 according to the maximum bandwidth of the host transmission interface P0, the first transmission rate of the USB device D1 and the second transmission rate of the USB device D2.

In an embodiment, when the maximum bandwidth of the host transmission interface P0 is larger than a predetermined bandwidth, the control module 110 determines the first service proportion of the USB device D1 and the second service proportion of the USB device D2 according to the first transmission rate of the USB device D1 and the second transmission rate of the USB device D2. In an embodiment, the predetermined bandwidth is larger than or equals to a bandwidth corresponding to the lower one of the first transmission rate and the second transmission rate.

In an embodiment, when the maximum bandwidth of the host transmission interface P0 is larger than a predetermined bandwidth, the control module 110 determines the sum of the first service proportions WT1 and the sum of the second service proportions WT2 according to the first transmission rate of the USB device D1 and the second transmission rate of the USB device D2. The sum of the first service proportions WT1 is allocated to the USB devices with the first transmission rate (which is the USB device D1 in the embodiment shown in FIG. 1). The sum of the second service proportions WT2 is allocated to the USB devices with the second transmission rate (which is the USB device D2 in the embodiment shown in FIG. 1).

When the first transmission rate of the USB device D1 is larger than the second transmission rate of the USB device D2, the sum of the first service proportions WT1 is larger than the sum of the second service proportions WT2. When the first transmission rate of the USB device D1 equals to the second transmission rate of USB device D2, the sum of the first service proportions WT1 equals to the sum of the second service proportions WT2. When the first transmission rate of the USB device D1 is smaller than the second transmission rate of the USB device D2, the sum of the first service proportions WT1 is smaller than the sum of the second service proportions WT2.

In an embodiment, when the maximum bandwidth of the host transmission interface P0 is larger than 5 GB/s, the control module 110 sets the sum of the first service proportions WT1 as 80%, and sets the sum of the second service proportions WT2 as 20%. Thus, the first service proportion of the USB device D1 is 80%, and the second service proportion of the USB device D2 is 20%.

When the maximum bandwidth of the host transmission interface P0 is not larger than the predetermined bandwidth, the control module 110 allocates the sum of the first service proportions WT1 and the sum of the second service proportions WT2 equally.

In an embodiment, when the maximum bandwidth of the host transmission interface P0 is not larger than 5 GB/s, the control module 110 sets the sum of the first service proportions WT1 and the sum of the second service proportions WT2 as 50%. Thus, both the first service proportion of the USB device D1 and the second service proportion of the USB device D2 are 50%.

The values of the sum of the first service proportions WT1 and the sum of the second service proportions WT2 can be changed according to practical requirements.

In the step S4, the control module 110 receives the first transmission data from the USB device D1 and the second transmission data from the USB device D2 via the device transmission interfaces P1 and P2 according to the first service proportion of the USB device D1 and the second service proportion of the USB device D2, and the control module 110 provides the first transmission data and the second transmission data to the host 20 via the host transmission interface P0.

In an embodiment, the first service proportion is 80%, and the second service proportion is 20%, the control module 110 transmits the first transmission data to the host 20 four times, and transmits the second transmission data to the host 20 once.

As a result, when the host transmission interface P0 has a large bandwidth, the whole transmission efficiency of the data transmission system 10 can be improved by allocating a higher service proportion to the USB device with a higher transmission rate.

In an embodiment, the control module 110 dynamically calculates the sum of the first service proportions WT1 and the sum of the second service proportions WT2 according to the first transmission rate of the USB device D1 and the second transmission rate of the USB device D2. Consequently, the USB devices D1 and D2 can fully utilize the bandwidth of the host transmission interface P0, to improve the transmission efficiency of the data transmission system 10.

Figure 3A:
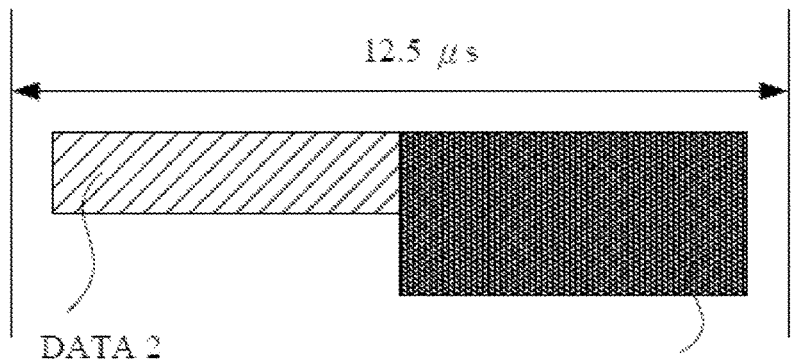
FIG. 3A to FIG. 3C are schematic diagram showing a transmission efficiency in different embodiments.
Figure 3B:
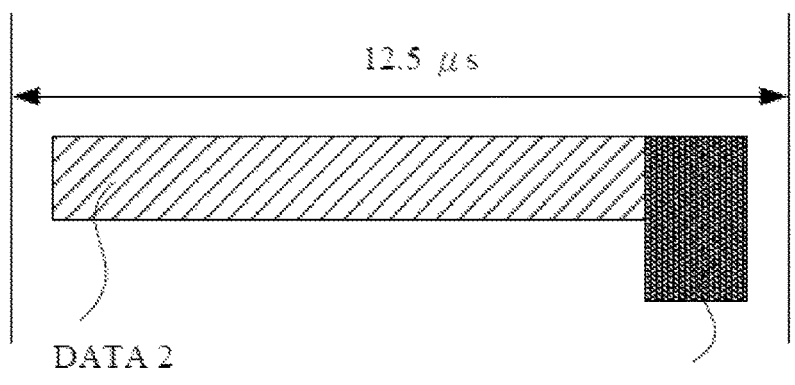
Figure 3C:
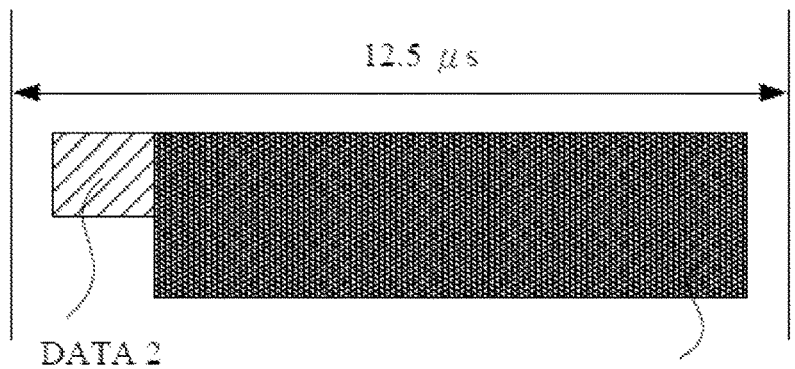

Comparison of the settings of the first service proportion and the second service proportion is illustrated with FIGS. 3A to 3C.

In the embodiment, the maximum bandwidth of the host transmission interface P0 is 8 GB/s, a service duration length of a single micro frame of the host transmission interface P0 is 12.5 µs, and a maximum data transmission amount in the service duration length of the single micro frame of the host transmission interface P0 is 8 (GB/s)×12.5 (µs)=100 (GB/s×µs). The USB device D1 supports the USB 3.1 interface, and the transmission rate is 10 GB/s. The USB device D2 supports the USB 3.0 interface, and the transmission speed is 5 GB/s. A sum of the service duration length of the single micro frames of the USB devices D1 and D2 is 0.8 times of that of the host transmission interface P0, and the sum is 12.5 (µs)×0.8=10 (µs).

Please refer to FIG. 3A, when the first service proportion of the USB device D1 is 50%, and the second service proportion of the USB device D2 is 50%, the total amount of the first transmission data DATA1 of the USB device D1 received and transmitted by the control module 110 in the service duration length of the single micro frame is 10 (GB/s)×10 (µs)×50%=50 (GB/s×µs), and the total amount of the second transmission data DATA2 of the USB device D2 received and transmitted by the control module 110 in the service duration length of the single micro frame is 5 (GB/s)×10 (µs)×50%=25 (GB/s×µs). Consequently, in the service duration length of the single micro frame, the amount of data transmitted by the host transmission interface P0 (which equals to a sum of the total amount of the first transmission data DATA1 and the total amount of the second transmission data DATA2) counts for 75% (which equals to (50 (GB/s×µs)+25 (GB/s×µs))/100 (GB/s×µs)) of the maximum data transmission amount of the host transmission interface P0.

Please refer to FIG. 3B, when the first service proportion of the USB device D1 is 20%, and the second service proportion of the USB device D2 is 80%, the total amount of the first transmission data DATA1 of the USB device D1 received and transmitted by the control module 110 in the service duration length of the single micro frame is 10 (GB/s)×10 (µs)×20%=20 (GB/s×µs), and the total amount of the second transmission data DATA2 of the USB device D2 received and transmitted by the control module 110 in the service duration length of the single micro frame is 5 (GB/s)×10 (µs)×80%=40 (GB/s×µs). Consequently, in the service duration length of the single micro frame, the amount of data transmitted by the host transmission interface P0 (which equals to the total amount of the first transmission data DATA1 plus the total amount of the second transmission data DATA2) counts for 60% (which equals to (20 (GB/s×µs)+40 (GB/s×µs))/100 (GB/s×µs)) of the maximum data transmission amount of the host transmission interface P0.

Please refer to FIG. 3C, when the first service proportion of the USB device D1 is 80%, and the second service proportion of the USB device D2 is 20%, the total amount of the first transmission data DATA1 of the USB device D1 received and transmitted by the control module 110 in the service duration length of the single micro frame is 10 (GB/s)×10 (µs)×80%=80 (GB/s×µs), and the total amount of the second transmission data DATA2 of the USB device D2 received and transmitted by the control module 110 in the service duration length of the single micro frame is 5 GB/s×10 (µs)×20%=10 (GB/s×µs). Consequently, in the service duration length of the single micro frame, the amount of data transmitted by the host transmission interface P0 (which equals to the total amount of the first transmission data DATA1 plus the total amount of the second transmission data DATA2) counts for 90% (which equals to (80 (GB/s×µs)+10 (GB/s×µs))/100 (GB/s×µs)) of the maximum data transmission amount of the host transmission interface P0.

Figure 4:
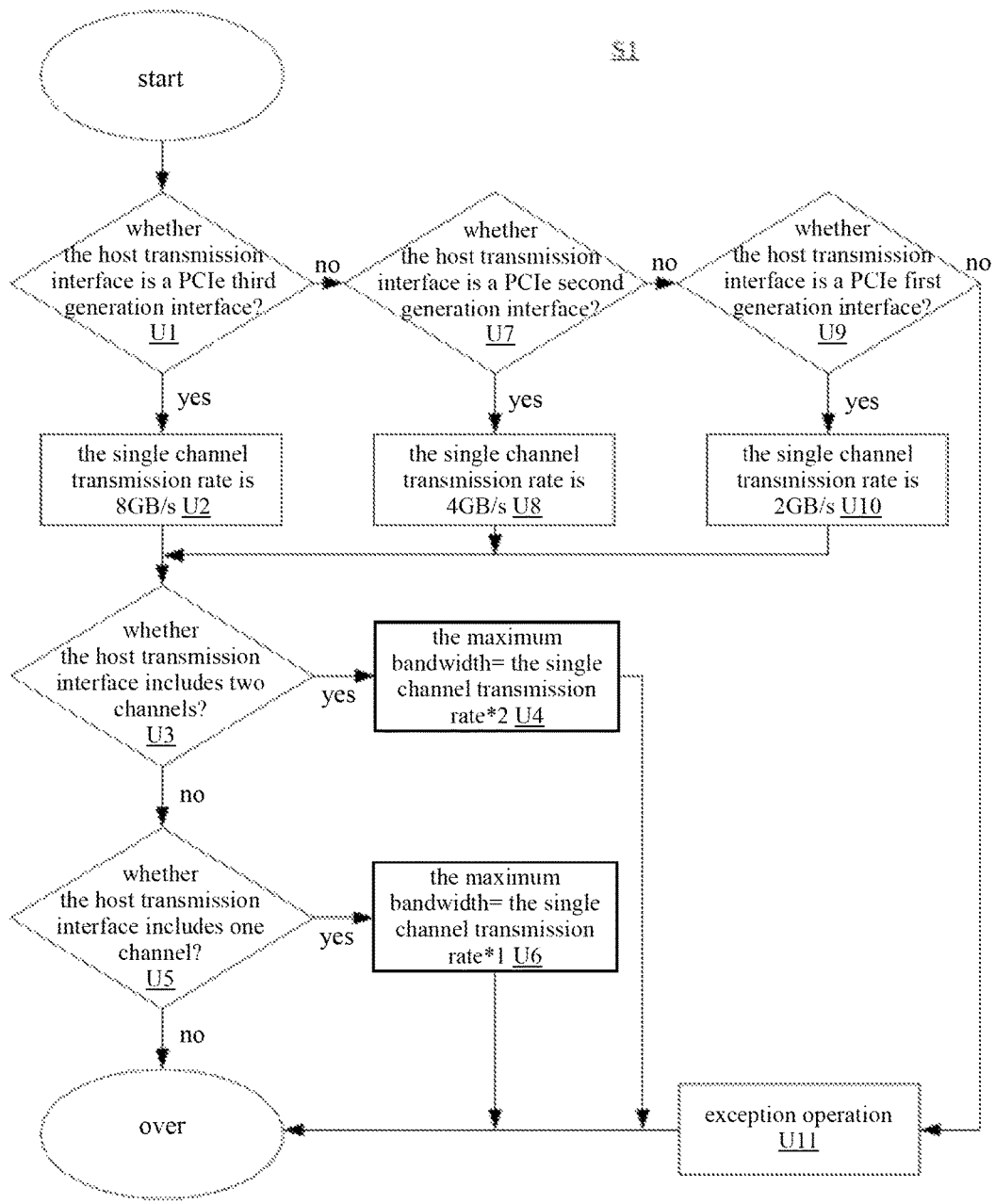
FIG. 4 is a flow chart showing details of a data transmission method in an embodiment.

FIG. 4 is a flow chart showing details of the step S1 of the data transmission method 200 in an embodiment. The data transmission method is not limited to the sequence of steps in the following unless expressly stated. The steps can be executed at the same time or have overlaps on the operation time.

In the step U1, the control module 110 determines whether the host transmission interface P0 is a PCIe third generation interface. If yes, the step U2 is executed; and if no, the step U3 is executed.

In the step U2, if the host transmission interface P0 is a PCIe third generation interface, the control module 110 obtains that the single channel transmission rate of the host transmission interface P0 is 8 GB/s, and the step U3 is executed.

In the step U3, the control module 110 determines whether the host transmission interface P0 includes two channels. If yes, the step U4 is executed; and if no, the step U5 is executed.

In the step U4, if the host transmission interface P0 includes two channels, the control module 110 obtains the maximum bandwidth of the host transmission interface P0 (which is twice of the single channel transmission rate of the host transmission interface P0), and the process is over.

In the step U5, if the host transmission interface P0 does not include two channels, the control module 110 determines whether the host transmission interface P0 includes one channel. If yes, the step U6 is executed; and if no, the process is over.

In the step U6, if the host transmission interface P0 includes one channel, the control module 110 obtains the maximum bandwidth of the host transmission interface P0 (which is the single channel transmission rate of the host transmission interface P0), and the process is over.

In the step U7, if the host transmission interface P0 is not a PCIe third generation interface, the control module 110 determines whether the host transmission interface P0 is a PCIe second generation interface. If yes, the step U8 is executed; and if no, the step U9 is executed.

In the step U8, if the host transmission interface P0 is a PCIe second generation interface, the control module 110 obtains that the single channel transmission rate of the host transmission interface P0 is 4 GB/s.

In the step U9, if the host transmission interface P0 is not a PCIe second generation interface, the control module 110 determines whether the host transmission interface P0 is a PCIe first generation interface. If yes, the step U10 is executed; and if no, the step U11 is executed.

In the step U10, if the host transmission interface P0 is a PCIe first generation interface, the control module 110 obtains that the single channel transmission rate of the host transmission interface P0 is 2 GB/s.

In the step U11, if the host transmission interface P0 is not a PCIe first generation interface, the control module 110 executes an exception operation and the process is over.

The control module 110 gets to obtain the maximum bandwidth of the host transmission interface P0 via the process stated above.

Figure 5:
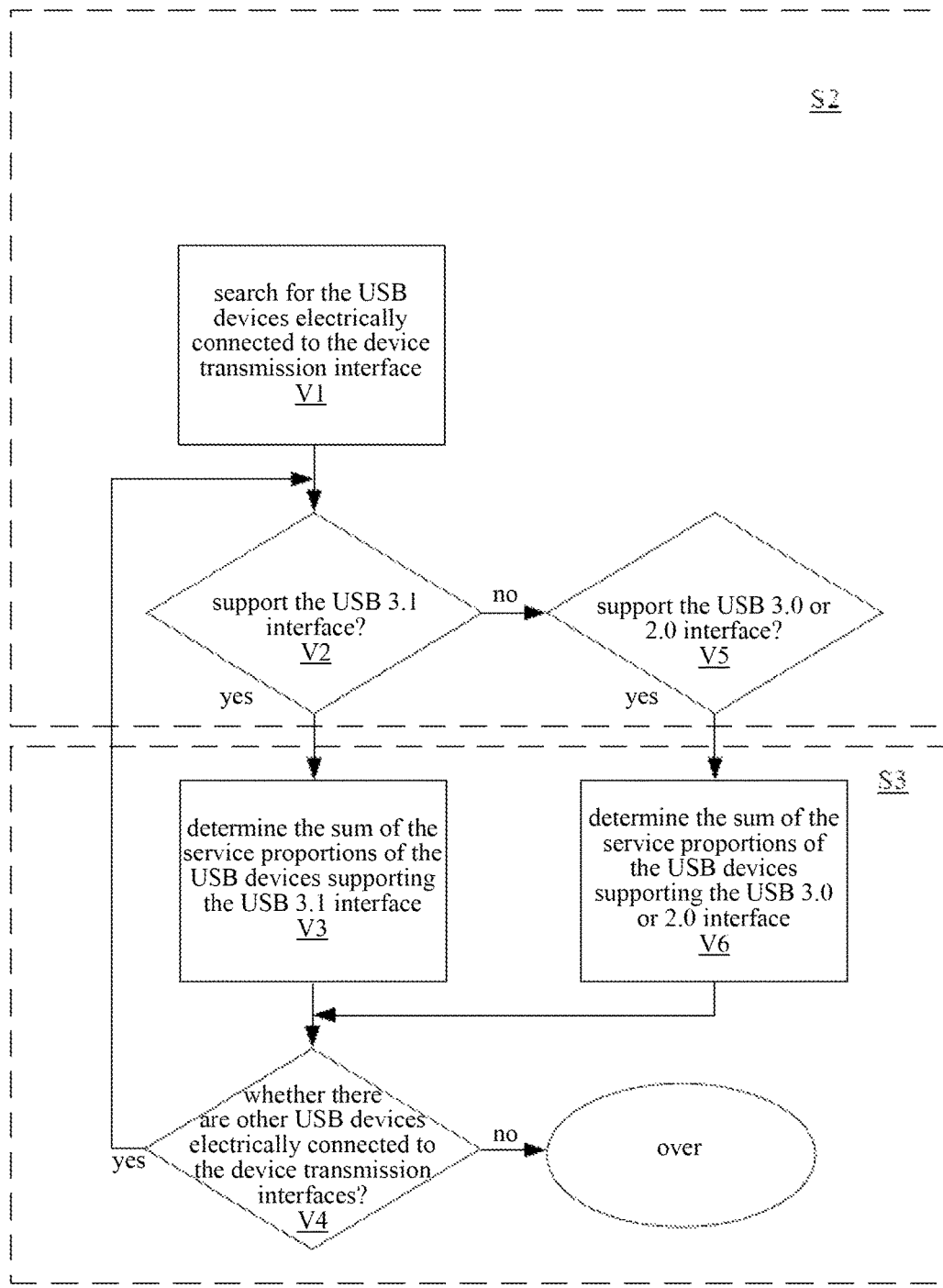
FIG. 5 is a flow chart showing details of a data transmission method in an embodiment.

FIG. 5 is a flow chart showing details of the steps S2 and S3 of the data transmission method 200 in an embodiment. The data transmission method is not limited to the sequence of steps in the following unless expressly stated. The steps can be executed at the same time or have overlaps on the operation time.

In the step V1, the control module 110 searches for the USB devices electrically connected to the device transmission interfaces P1 to P4.

In the step V2, the control module 110 determines whether one of the USB devices electrically connected to the device transmission interfaces P1 to P4 supports the USB 3.1 interface. If yes, the step V3 is executed; and if no, the step V5 is executed.

In the step V3, if a USB device supports the USB 3.1 interface (for example, the USB device D1 supports the USB 3.1 interface), the control module 110 determines the sum of the first service proportions WT1 according to the maximum bandwidth of the host transmission interface P0, the first transmission rate of the USB device D1 and the second transmission rate of the USB device D2, and the control module 110 allocates the sum of the first service proportions WT1 to the USB devices which support the USB 3.1 interface as the service proportion. In the embodiment, since the USB device D1 supports the USB 3.1 interface, both the sum of the first service proportions WT1 and the first service proportion of the USB device D1 are 80%.

In the step V4, the control module 110 determines whether other USB devices are electrically connected to the device transmission interfaces P1 to P4. If yes, the step V2 is executed again to determine whether the other USB devices support the USB 3.1 interface; and if no, the process is over.

In the step V5, if a USB device does not support the USB 3.1 interface (for example, the USB device D2 supports the USB 3.0 interface), it is determined that whether the USB device supports the USB 3.0 or 2.0 interface. If yes, the step V6 is executed.

In the step V6, if a USB device supports the USB 3.0 or 2.0 interface, the control module 110 determines the sum of the second service proportions WT2 according to the maximum bandwidth of the host transmission interface P0, the first transmission rate of the USB device D1 and the second transmission rate of the USB device D2, and the control module 110 allocates the sum of the second service proportions WT2 to the USB devices which support the USB 3.0 or 2.0 interface as the service proportion. In the embodiment, since the USB device D2 supports the USB 3.0 or 2.0 interface, both the sum of the second service proportions WT2 and the second service proportion of the USB device D2 are 20%.

As stated above, the control module 110 determines the first service proportion of the USB device D1 and the second service proportion of the USB device D2 according to the first transmission rate of the USB device D1 and the second transmission rate of the USB device D2.

In an embodiment, the USB device D1 includes a periodic endpoint, and the USB device D2 includes an asynchronous endpoint. When the USB device D1 has the first transmission data for transmission, and the USB device D2 has the second transmission data for transmission at the same time, the control module 110 transmits the first transmission data and the second transmission data to the host 20 according to an extensible host controller interface (xHCI) specification, and the first transmission data occupies 90% of the bandwidth of the host transmission interface P0, and the second transmission data occupies 10% of the bandwidth of the host transmission interface P0.

When the first transmission data of the USB device D1 is not enough to occupy 90% of the bandwidth of the host transmission interface P0, the control module 110 can utilize the rest of the bandwidth of the host transmission interface P0 to transmit the second transmission data. For example, when the first transmission data occupies 75% of the bandwidth of the host transmission interface P0, the rest 25% of the bandwidth of the host transmission interface P0 is used by the control module 110 to transmit the second transmission data.

In the previous embodiments, the device transmission interfaces P1 to P4 of the host USB controller 100 are electrically connected to two USB devices D1 and D2. However, the number M of the connected USB devices is not limited herein The number "M" is a natural number which is larger than 2.

Figure 6:
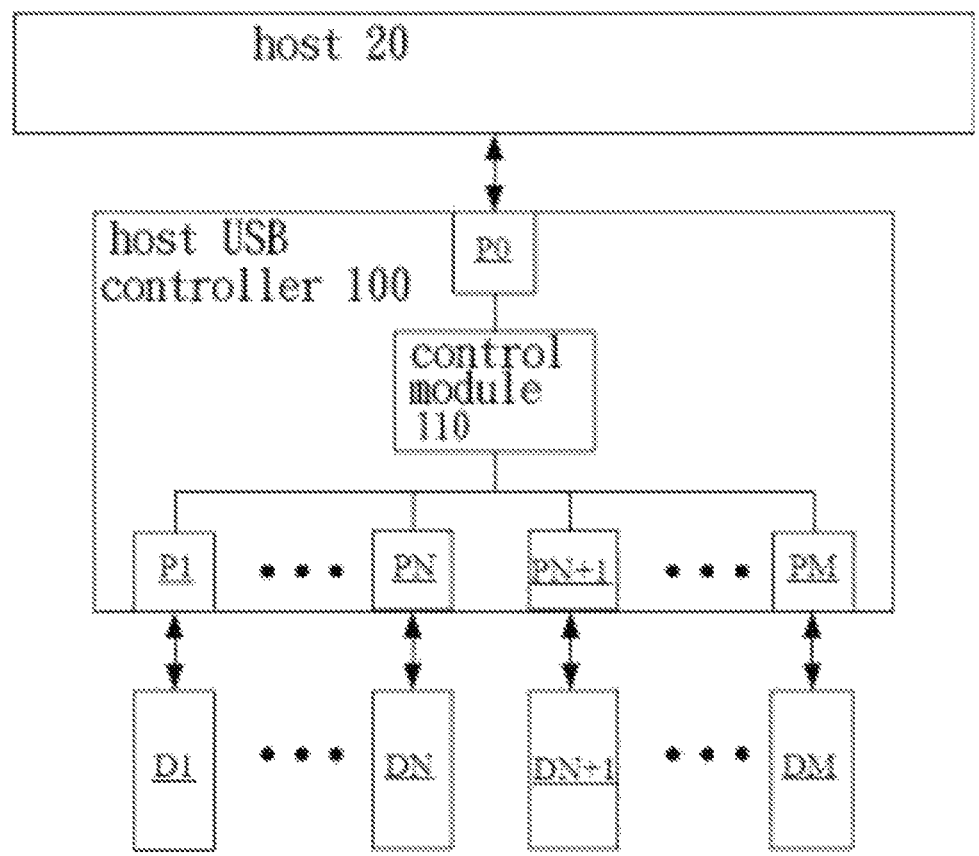
FIG. 6 is a schematic diagram showing a data transmission system in an embodiment.

Please refer to FIG. 6, in the embodiment, the host USB controller 100 is electrically connected to M USB devices D1 to DM via the device transmission interfaces P1 to PM. The device transmission interfaces P1 to PM include a group of the first device transmission interfaces (which include the device transmission interfaces P1 to PN) electrically connected to the USB devices D1 to DN which support the USB 3.1 interface. The device transmission interfaces P1 to PM further include a group of the second device transmission interfaces (which include the device transmission interfaces PN+1 to PM) electrically connected to the USB devices DN+1 to DM which support the USB 3.0 or 2.0 interface, and the number "N" is a natural number. In the embodiment, the host USB controller 100 is similar with the previous embodiment, and the differences are described in the following.

In the embodiment, the host USB controller 100 executes the steps S1 and S2, the similar relating description is omitted herein.

In the embodiment, after the step V2 in FIG. 5 is executed, the control module 110 allocates the sum of the first service proportions WT1 (such as 80%) to the USB devices D1 to DN which support the USB 3.1 interface according to the maximum burst sizes of the USB devices D1 to DN.

In an embodiment, if the maximum burst sizes of the USB device D1 to DN are represented as B1 to BN, respectively, the service proportion Wi of the USB device Di (i=1, ..., N) of the USB devices D1 to DN is calculated via the formula:

$$Wi = WT1 \times Bi/(B1+ \ldots +BN)$$

After the previous steps are executed, the host USB controller 100 continues to execute the step V4.

In the embodiment, after the step V5 in FIG. 5 is executed, the control module 110 allocates the sum of the second service proportions WT2 (such as 20%) to the USB devices DN+1 to DM which support the USB 3.0 or 2.0 interface in average.

In an embodiment, the service proportion of each one of the USB devices DN+1 to DM equals to the sum of the second service proportions WT2 divided by (M−N).

After the previous steps are executed, the host USB controller 100 continues to execute the step V4.

Figure 7:
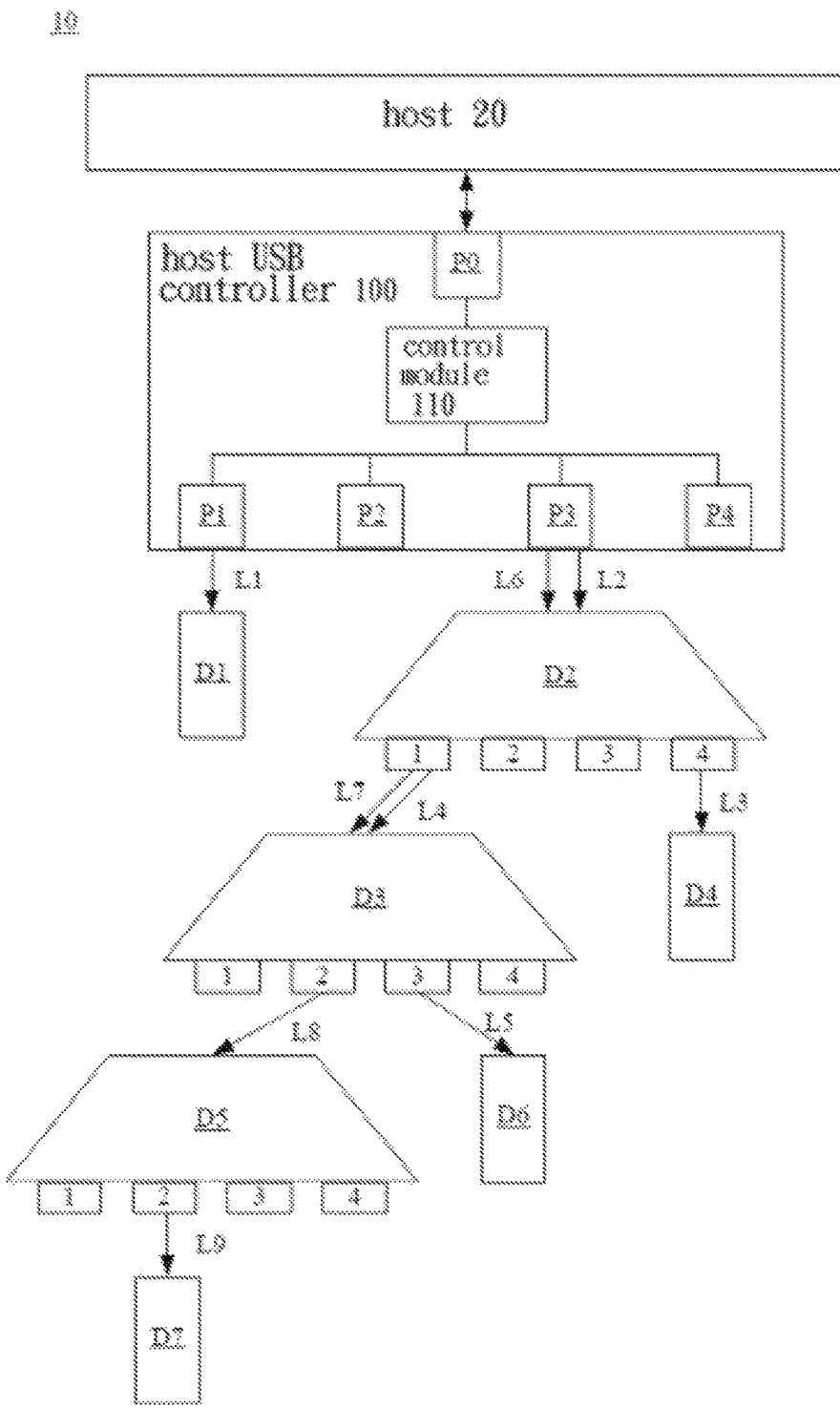
FIG. 7 is a schematic diagram showing a data transmission system in an embodiment.

FIG. 7 is a schematic diagram showing a data transmission system 10 in an embodiment. The host USB controller 100 in the embodiment is similar with that in the previous embodiments, which is omitted herein.

In the embodiment, the device transmission interface P1 is electrically connected to the USB device D1 via the connection L1. The device transmission interface P3 is electrically connected to the USB device D2 via the connections L2 and L6. The USB device D2 is a USB hub. The first port of the USB device D2 is electrically connected to the USB device D3 via the connections L4 and L7, and the fourth port of the USB device D2 is electrically connected to the USB device D4 via the connection L3. The USB device D3 is a USB hub. The second port of the USB device D3 is electrically connected to the USB device D5 via the connection L8, and the third port of the USB device D3 is electrically connected to the USB device D6 via the connection L5. The USB device D5 is a USB hub, and the second port of the USB device D5 is electrically connected to the USB device D7 via the connection L9.

In the embodiment, the USB devices D1 and D6 support the USB 3.0 interface, the USB device D4 supports the USB 3.1 interface, and the USB device D7 supports the USB 2.0 interface. The connections L2 and L3 support the data transmission of the USB 3.1 interface, and the data transmission rate is 10 GB/s. The connections L1, L4 and L5 support the data transmission of the USB 3.0 interface, and the data transmission rate is 5 GB/s. The connections L7, L8 and L9 support the data transmission of the USB 2.0 interface, and the data transmission rate is 0.48 GB/s.

In the embodiment, the data transmission rate of the USB devices which electrically connected to the ports of the USB hub is limited by the data transmission rate of the USB hub. In an embodiment, when the connection L8 corresponding to the USB device D5 only supports the USB 2.0 interface, even though the USB device D7 supports the USB 3.1 interface, the USB device D7 can only transmit data with the data transmission rate of the USB 2.0 interface. Thus, the USB device D7 is regarded as supporting the USB 2.0 interface.

In the embodiment, the control module 110 determines the service proportions W1 to W9 of the connections L1 to L9 according to the data transmission rate of the connections L1 to L9, and the control module 110 transmits data according to the service proportions.

In an embodiment, the control module 110 determines that the sum of the service proportions of the connections L2 and L3 which support the USB 3.1 interface is 80%, the sum of the service proportions of the connections L1, L4 and L5 which support the USB 3.0 interface is 19%, and the sum of the service proportions of the connections L7, L8 and L9 which support the USB 2.0 interface is 1%.

Consequently, the connection with a higher transmission rate has a higher service proportion, and the whole transmission efficiency of the data transmission system 10 is improved.

The bus controller and the data transmission method thereof determine a service proportion according to a transmission rate of the device, and a higher service proportion is allocated to the device with a higher transmission rate. Thus, the whole transmission efficiency of the data transmission system is improved.

What is claimed is:

1. A bus controller, comprising:
   a group of first device transmission interfaces electrically connected to at least one first device;
   a group of second device transmission interfaces electrically connected to at least one second device;
   a host transmission interface electrically connected to a host; and
   a control module electrically connected to the first device transmission interfaces, the second device transmission interfaces and the host transmission interface, respectively,
   wherein the control module determines whether a maximum bandwidth of the host transmission interface is larger than a bandwidth corresponding to the lower one of a first transmission rate of the at least one first device and a second transmission rate of the at least one second device;
   wherein the control module determines a sum of first service proportions of the first device transmission interfaces and a sum of the second service proportions of the second device transmission interfaces, and the sum of first service proportions equals to the sum of second service proportions when the maximum bandwidth of the host transmission interface is smaller than or equals to the bandwidth corresponding to the lower one of the first transmission rate and the second transmission rate;
   wherein the control module further determines at least one first service proportion according to the sum of the first service proportions, and determines at least one second service proportion according to the sum of the second service proportions, and the control module transmits data to the host according to the at least one first service proportion of the at least one first device and the at least one second service proportion of the at least one second device.

2. The bus controller according to claim 1, wherein the at least one first device includes a plurality of the first devices, the at least one second device includes a plurality of the second devices, the control module allocates the sum of the first service proportions to the first devices as a plurality of the first service proportions of the at least one first service proportion, and the control module allocates the sum of the second service proportions to the second devices as a plurality of the second service proportions of the at least one second service proportion.

3. The bus controller according to claim 2, wherein the control module allocates the sum of the first service proportions to the first devices as the first service proportions according to a plurality of first maximum burst sizes of the first device.

4. The bus controller according to claim 3, wherein a ratio among the first maximum burst sizes equals to a ratio among the first service proportions.

5. A data transmission method, comprising following steps:
   determining whether a maximum bandwidth of a host transmission interface is larger than a bandwidth corresponding to the lower one of a first transmission rate of at least one first device and a second transmission rate of at least one second device;
   if the maximum bandwidth of the host transmission interface is smaller than or equals to the bandwidth corresponding to the lower one of the first transmission rate and the second transmission rate, arranging a sum of first service proportions equals to a sum of second service proportions;
   determining at least one first service proportion of the first device according to the sum of the first service proportions, and determining at least one second service proportion of the second device according to the sum of the second service proportions; and
   transmitting at least one package of first transmission data of the first device and at least one package of second transmission data of the second device to a host via the host transmission interface according to the first service proportion and the second service proportion.

6. The data transmission method according to claim 5, wherein the at least one first device includes a plurality of the first devices, the at least one second device includes a plurality of the second devices, and the step of determining the at least one first service proportion of the first devices according to the sum of the first service proportions, and determining the at least one second service proportion of the second devices according to the sum of the second service proportions includes:
　　allocating the sum of the first service proportions to the first devices as a plurality of the first service proportions of the at least one first service proportion; and
　　allocating the sum of the second service proportions to the second devices as a plurality of the second service proportions of the at least one second service proportion.

7. The data transmission method according to claim 6, wherein the step of allocating the sum of the first service proportions to the first devices as the first service proportions includes:
　　allocating the sum of the first service proportions to the first devices as the first service proportions according to a plurality of first maximum burst sizes of the first devices.

8. The data transmission method according to claim 7, wherein a ratio of the first maximum burst sizes equals to a ratio of the first service proportions.

9. The bus controller according to claim 1, wherein the sum of the first service proportions is larger than the sum of the second service proportions when the first transmission rate is larger than the second transmission rate and the maximum bandwidth of the host transmission interface is larger than a bandwidth corresponding to the second transmission rate.

10. The data transmission method of claim 5, wherein if the first transmission rate is larger than the second transmission rate and the maximum bandwidth of the host transmission interface is larger than a bandwidth corresponding to the second transmission rate, arranging the sum of the first service proportions to be larger than the sum of the second service proportions.

\* \* \* \* \*